(12) United States Patent
Liu et al.

(10) Patent No.: US 12,024,375 B2
(45) Date of Patent: Jul. 2, 2024

(54) CUP PLACING DEVICE FOR PLANTING CUP

(71) Applicant: FUJIAN SANAN SINO-SCIENCE PHOTOBIOTECH CO., LTD., Quanzhou (CN)

(72) Inventors: Ganlin Liu, Quanzhou (CN); Zhiyin Li, Quanzhou (CN)

(73) Assignee: FUJIAN SANAN SINO-SCIENCE PHOTOBIOTECH CO., LTD.

( * ) Notice: Subject to any disclaimer, the term of this patent is extended or adjusted under 35 U.S.C. 154(b) by 307 days.

(21) Appl. No.: 17/607,410

(22) PCT Filed: Aug. 16, 2019

(86) PCT No.: PCT/CN2019/100928
§ 371 (c)(1),
(2) Date: Oct. 29, 2021

(87) PCT Pub. No.: WO2020/224083
PCT Pub. Date: Nov. 12, 2020

(65) Prior Publication Data
US 2022/0204286 A1 Jun. 30, 2022

(30) Foreign Application Priority Data

May 6, 2019 (CN) .......................... 201910370237.1

(51) Int. Cl.
*B65G 47/90* (2006.01)

(52) U.S. Cl.
CPC ......... *B65G 47/901* (2013.01); *B65G 47/907* (2013.01); *B65G 2201/0235* (2013.01)

(58) Field of Classification Search
CPC ................ B65G 47/901; B65G 47/907; B65G 2201/0235; B65G 47/912; B65G 47/918; Y02P 60/21; A01G 9/086; A01G 9/088
See application file for complete search history.

(56) References Cited

FOREIGN PATENT DOCUMENTS

| CN | 203699317 | * | 7/2014 | ............ B65G 47/26 |
|---|---|---|---|---|
| CN | 203699317 U | | 7/2014 | |
| CN | 106044203 A | | 10/2016 | |
| CN | 107745962 A | | 3/2018 | |

(Continued)

*Primary Examiner* — Lynn E Schwenning
(74) *Attorney, Agent, or Firm* — Jose Cherson Weissbrot (57) ABSTRACT

A cup-loading device for planting cups includes a profile bracket, a horizontal driving mechanism, a pressing mechanism and a planting cup grasping mechanism fixed at an output end of the pressing mechanism, wherein the horizontal driving mechanism and the pressing mechanism are disposed on the profile bracket, an output end of the horizontal driving mechanism is connected to the pressing mechanism so that the pressing mechanism move horizontally along the profile bracket, and the planting cup grasping mechanism includes a plurality of mechanical clamping jaws and a guide device for adjusting a spacing between adjacent mechanical clamping jaws. The pressing mechanism moves to the arranged planting cups, the planting cup grasping mechanism is pushed downward to touch the planting cup, and then the planting cups are arranged at equal distances on the planting cup grasping mechanism, and then accurately fill in the planting plate.

7 Claims, 6 Drawing Sheets

(56) References Cited

FOREIGN PATENT DOCUMENTS

| CN | 107852918 | * | 3/2018 | ............. A01C 11/02 |
| CN | 108340361 | * | 7/2018 | ................ B25J 9/02 |
| CN | 108340361 A | | 7/2018 | |
| CN | 208265254 U | | 12/2018 | |
| CN | 109533963 A | | 3/2019 | |
| CN | 110002227 A | | 7/2019 | |
| IN | 108946159 A | | 12/2018 | |

* cited by examiner

CUP PLACING DEVICE FOR PLANTING CUP

FIELD OF THE INVENTION

The present invention relates to the technical field of planting, in particular to a cup-loading device for planting cups.

BACKGROUND OF THE INVENTION

In plant factories and hydroponic plants, after the hydroponic seedlings are afforested in the nursery room, manual or machine work is required to first fill planting cups on a planting plate, then tear sponge blocks into sponge strips, then tear sponge strips into sponge blocks, and then grip the sponge blocks directly and insert into the planting cups. This process is called sponge tearing and filling.

In the prior art, the planting cups are arranged regularly according to the number and then filled onto the planting plate by machinery. In this process, the planting cups are easily scattered or the arrangement distance is not well controlled to make the filling of the planting cups inclined, resulting in the subsequent processing, which increases the manual labor degree and does not reduce the efficiency.

BRIEF SUMMARY OF THE INVENTION

In this regard, it is necessary to provide a cup-loading device for planting cups, which can stably clamp the planting cups and accurately place them on the planting plate in equidistant rows through the components of the device and their engagement relationships.

To achieve the above objective, the present invention provides a cup-loading device for planting cups, which includes a profile bracket, a horizontal driving mechanism, a pressing mechanism and a planting cup grasping mechanism fixed at an output end of the pressing mechanism, wherein the horizontal driving mechanism and the pressing mechanism are disposed on the profile bracket, an output end of the horizontal driving mechanism is connected to the pressing mechanism, to drive the pressing mechanism to move horizontally along the profile bracket, and the pressing mechanism drives the planting cup grasping mechanism to move in a vertical direction, and the planting cup grasping mechanism includes a plurality of mechanical clamping jaws and a guide device for adjusting a spacing between adjacent mechanical clamping jaws. The pressing mechanism pushes the planting cup grasping mechanism to move downward to grab the planting cups, and the guide device makes the grabbed planting cups arranged separately at an equal distance, and the planting cup grasping mechanism can accurately fill the planting cups into the planting plate to ensure the stability of the follow-up work.

Further, the horizontal driving mechanism includes a cylinder mounting seat and a biaxial cylinder, the cylinder mounting seat is fixedly connected to the profile bracket, the biaxial cylinder is mounted on the cylinder mounting seat, the biaxial cylinder is provided with a push plate, the push plate is provided with an auxiliary cylinder for adjusting a horizontal displacement distance, and an output end of the auxiliary cylinder is fixedly connected with the pressing mechanism, to enable the pressing mechanism to move horizontally on the profile bracket, and to make it move in an exact position.

Further, the pressing mechanism includes a mounting base, a mounting seat and a pressing cylinder, the mounting seat is disposed and mounted on an output and of the horizontal driving mechanism, the mounting base is T-shaped and connected to one side of the mounting seat, the pressing cylinder is disposed on the other side of the mounting seat, an output end of the pressing cylinder is fixedly connected with a transverse plate at a bottom end of the mounting seat, the planting cup grasping mechanism is disposed and mounted on the mounting base, the mounting seat is provided with a connecting plate and connecting blocks fixed at four corners of the connecting plate, the profile bracket is two symmetrical horizontal supporting rods, a guide rail mounting seat and a guide rail fixed on the guide rail mounting seat are disposed above the supporting rod, and the guide rail is provided with a mating slider which is fixedly connected with the connecting block, to ensure that the pressing mechanism can stably push the planting cup grasping mechanism to move stably up and down, while the setting of the profile bracket ensures more stable horizontal movement.

Further, the guide device includes a double-stroke cylinder, a plurality of pulling fastener blocks, a plurality of pulling fastener mounting blocks, a slide rail and a plurality of guide blocks arranged regularly on the slide rail, the pulling fastener mounting block is disposed on the corresponding guide block, the pulling fastener block is fixedly connected to the pulling fastener mounting block, an output end of the double-stroke cylinder is provided with a fixing block connected with the pulling fastener mounting block, output directions of the double-stroke cylinder are opposite, and the pulling fastener mounting block is fixedly connected with the mechanical clamping jaw, so that the mechanical clamping jaw can be pulled away smoothly.

Furthermore, a guide slot is defined on the pulling fastener mounting block, one end of the pulling fastener block is embedded in the guide slot, the other end of the pulling fastener block is fixedly connected with another pulling fastener mounting block, and the plurality of pulling fastener blocks are connected with the plurality of pulling fastener mounting blocks in the above manner, so that it can drive other pulling fastener mounting blocks as long as the first pulling fastener mounting blocks at both ends are pushed.

Furthermore, the double-stroke cylinder on the guide device is disposed on the mounting base, and the mounting base is provided with a slide rail groove matched with the slide rail on the guide device, and the double-stroke cylinder drives the pulling fastener mounting block to drive the guide block to move equidistantly on the slide rail, so that the mechanical clamping jaw can move stably.

Furthermore, the mechanical clamping jaw includes a moving claw and a clamping jaw fixed on an end portion of the moving claw, and the moving claw is disposed and mounted on the corresponding pulling fastener mounting block. The planting cup is clamped more stably.

Different from the prior art, the above technical solution has the following beneficial effects:
1. in the prevent invention, the pressing mechanism moves to the arranged planting cups through the horizontal driving mechanism, the planting cup grasping mechanism is pushed downward by the pressing mechanism to touch the planting cup, to realize automatic grasping of the planting cups, and then the planting cups are arranged at equal distances according to the requirements through the guide device on the planting cup grasping mechanism, and then accurately fill in the planting plate through the pressing mechanism, so that the cups can be steadily clamped and accurately placed on the planting plate with equal intervals.

2. The horizontal driving mechanism of the present invention is provided with an auxiliary cylinder to assist the operation of the biaxial cylinder, and through the auxiliary contraction of the auxiliary cylinder, the problem that the pressing mechanism moves too much or not enough can be effectively prevented, so that the horizontal driving mechanism can be positioned more accurately.

DESCRIPTION OF REFERENCE SIGNS 1. profile bracket, 101, supporting rod, 102, guide rail, 103, slider, 104, guide rail mounting seat, 2, horizontal driving mechanism, 201, cylinder mounting seat, 202, biaxial cylinder, 203, push plate, 204, auxiliary cylinder, 3, pressing mechanism, 301, mounting base, 3011, slide rail groove, 302, mounting seat, 303, pressing cylinder, 304, connecting plate, 305, connecting block, 306, transverse plate, 4, planting cup grasping mechanism, 401, mechanical clamping jaw, 4011, moving claw, 4012, clamping jaw, 402, guide device, 4021, double-stroke cylinder, 4022, pulling fastener block, 4023, pulling fastener mounting block, 40231, guide slot, 4024, slide rail, 4025, guide block, 4026, fixing block.

DETAILED DESCRIPTION OF THE INVENTION

In order to explain in details, the technical content, structural features, realized purpose and effect of the technical solution, the following details are described in combination with specific embodiments and accompanying drawings.

Referring to FIGS. 1-6, a cup-loading device for planting cups in this embodiment includes a profile bracket 1, the profile bracket 1 is two symmetrical horizontal supporting rods 101, and long side edges are parallel to an output direction of the horizontal driving mechanism 2. A guide rail mounting seat 104 and a guide rail 102 fixed on the guide rail mounting seat 104 are disposed above the supporting rod 101, and the guide rail 102 is provided with a mating slider 103.

Figure 1:
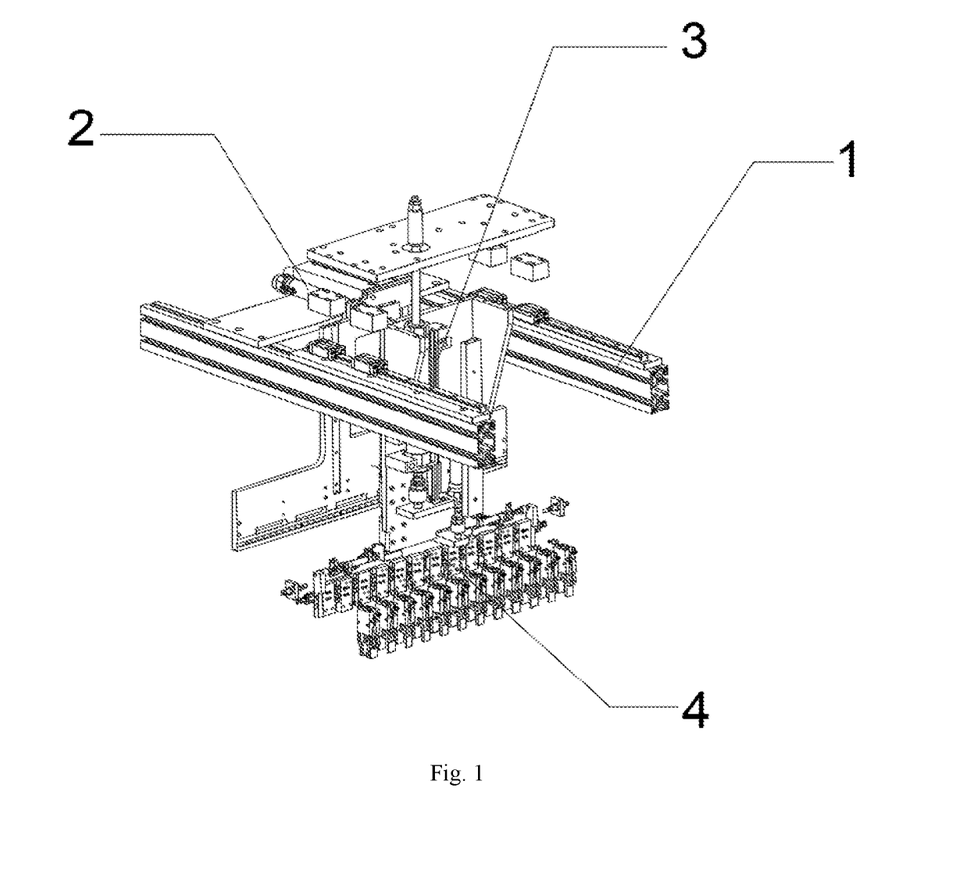
FIG. 1 is a structural schematic diagram of a cup-loading device for planting cups according to the present invention.
Figure 2:
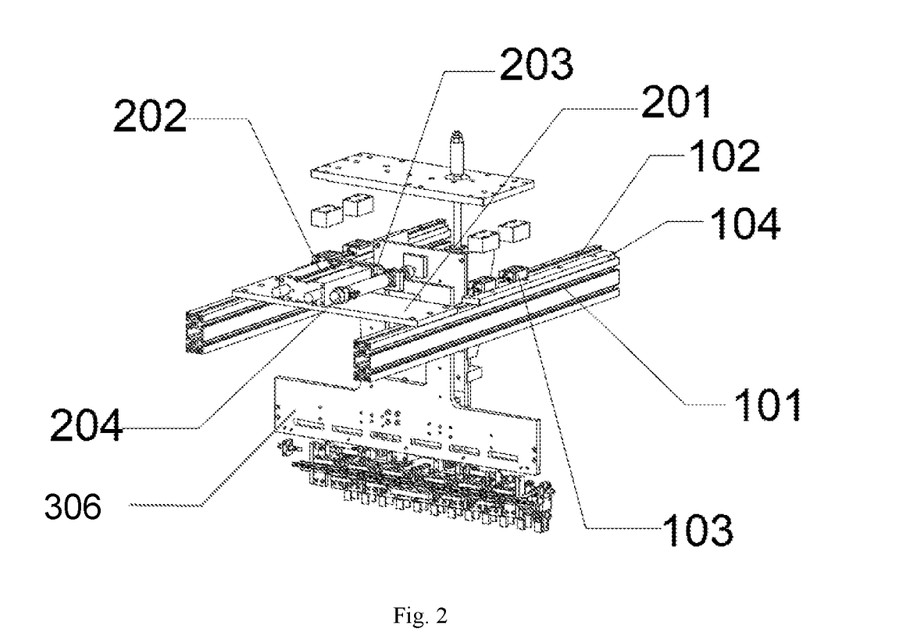
FIG. 2 is a structural schematic diagram of a horizontal driving mechanism in an embodiment.
Figure 3:
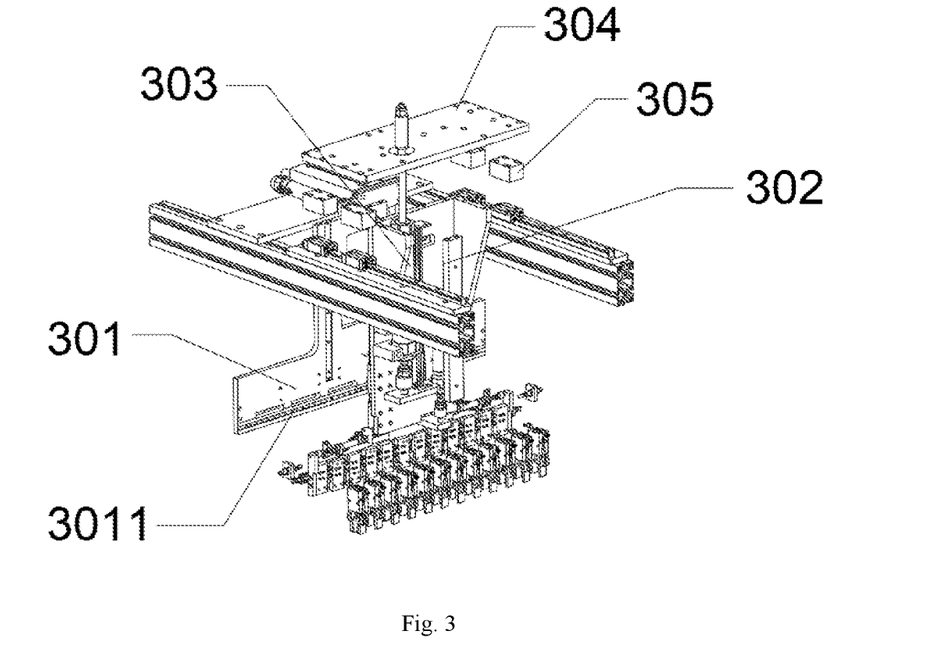
FIG. 3 is a structural schematic diagram of a pressing mechanism in an embodiment.

In this embodiment, the driving mechanism includes a horizontal driving mechanism 2, a pressing mechanism 3 and a planting cup grasping mechanism 4 fixed at an output end of the pressing mechanism 3, the planting cup grasping mechanism 4 is provided with a plurality of mechanical clamping jaws 401 and a guide device 402 for adjusting a spacing between adjacent mechanical clamping jaws 401, the horizontal driving mechanism 2 and the pressing mechanism 3 are disposed at an upper end of the profile bracket 1, the horizontal driving mechanism 2 includes a cylinder mounting seat 201 and a biaxial cylinder 202, two ends of the cylinder mounting seat 201 are fixedly connected to the supporting rod 101 on the profile bracket 1 through screws, a bottom end of the biaxial cylinder 202 is disposed and mounted on the upper end of the cylinder mounting seat 201, the output end of the biaxial cylinder 202 is provided with a push plate 203, the push plate 203 is provided with an auxiliary cylinder 204 for adjusting a horizontal displacement distance, the auxiliary cylinder 204 is horizontally parallel to the biaxial cylinder 202 and has the same output direction, an output end of the auxiliary cylinder 204 is fixedly connected with the pressing mechanism 3 to enable the horizontal driving mechanism 2 to move horizontally along the profile bracket 1, the pressing mechanism 3 includes a mounting base 301, a mounting seat 302 and a pressing cylinder 303, a top side of the mounting seat is disposed and mounted on the output end of the horizontal driving mechanism 2, the output end of the auxiliary cylinder 204 is fixedly connected with the top side of the mounting seat, the mounting base 301 is T-shaped and connected to one side of the mounting seat 302, two grooves are vertically disposed on both sides of the mounting base 301, and are matched with slide rails on an inner end sliding blocks of the mounting seat 302, the pressing cylinder 303 is disposed on the other side of the mounting seat corresponding to the mounting base 301, an output end of the pressing cylinder 303 extends in a direction of the mounting base 301 with a connecting fixing block, and is fixedly connected with a transverse plate 306 at the bottom end of the mounting seat 302 by screws, the planting cup grasping mechanism 4 is disposed and mounted on the transverse plate 306 of the mounting seat 302, and a connecting plate 304 is provided on a top end of the mounting seat. Four corners of the connecting plate 304 are provided with connecting blocks 305 fixed by screws. The connecting blocks 305 are fixedly connected with the slider 103 by screws.

Figure 4:
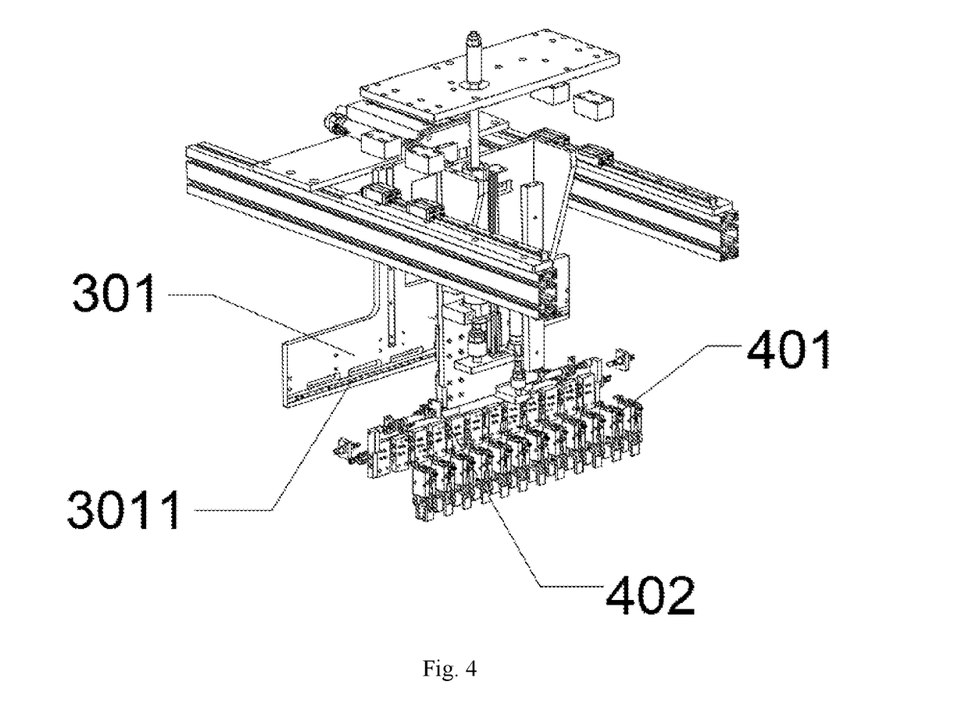
FIG. 4 is a structural schematic diagram of a planting cup grasping mechanism in an embodiment.
Figure 5:
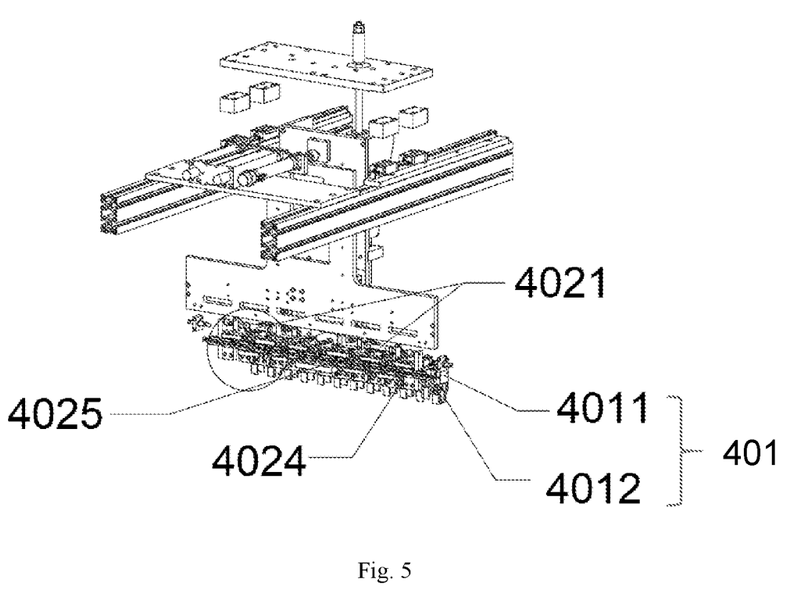
FIG. 5 is a structural schematic diagram of a guide device and a mechanical clamping jaw in an embodiment.
Figure 6:
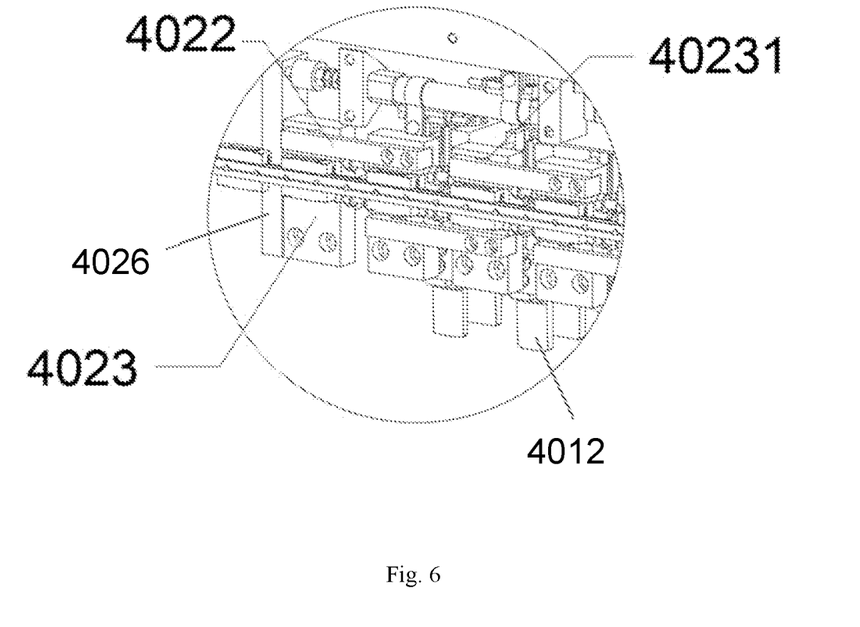
FIG. 6 is a structural schematic diagram of some details of the guide device in an embodiment.

In this embodiment, the guide device 402 includes a double-stroke cylinder 4021, a plurality of pulling fastener blocks 4022, a plurality of pulling fastener mounting blocks 4023, a slide rail 4024, and a plurality of guide blocks 4025 arranged regularly on the slide rail 4024, a back end of the pulling fastener mounting block 4023 is disposed and mounted on the guide block 4025 corresponding to the pulling fastener mounting block 4023, the pulling fastener block 4022 is fixedly connected to the pulling fastener mounting block 4023. Specifically, an upper half segment of a first pulling fastener mounting block 4023 at the distal-most end is provided with a guide slot 40231, the pulling fastener block 4022 has a U-shaped structure, the guide slot 40231 is fitted with one end of the pulling fastener block 4022, and this end of the pulling fastener block 4022 is slidable in the guide slot 40231, the other end of the pulling fastener block 4022 is fixedly connected with the upper half segment corresponding to the other pulling fastener mounting block 4023, a lower half segment of the pulling fastener mounting block 4023 fixed with the pulling fastener block 4022 at the upper half segment is further provided with a guide slot 40231, one end of the other pulling fastener block 4022 is fitted into the guide slot 40231, the other end of the pulling fastener block 4022 is fixedly connected with the lower half segment corresponding to the other pulling fastener mounting block 4023, the plurality of pulling fastener blocks 4022 are connected to the plurality of pulling fastener mounting blocks 4023 in the above manner, when moving one pulling fastener mounting block 4023, one end of the pulling fastener block 4022 slides on the guide slot 40231, when sliding to a certain position, the pulling fastener mounting block 4023 will be stuck, then when the pulling fastener mounting seat 302 continues to move, the pulling fastener block 4022 is driven to pull the next pulling fastener mounting block 4023 to move, and the size and shape of each pulling fastener block 4022 are the same, and the size of each pulling fastener mounting block 4023 and the guide slot 40231 provided on the pulling fastener mounting block 4023 are the same, so that the pulling fastener mounting blocks 4023 are separated at equal distances according to the above principle. An output end of the double-stroke cylinder 4021 is provided with a fixing block 4026 connected with the pulling fastener mounting block 4023, that is, the fixing block 4026 is fixedly mounted on the two pulling fastener mounting blocks 4023 at the most two ends of the plurality of pulling fastener mounting blocks 4023 by screws, output directions of the double-stroke cylinder 4021 are opposite, and the output directions of the double-stroke cylinder 4021 are moving from the middle to both ends. The double-stroke cylinder 4021 is relatively disposed and mounted on the mounting base 301, and the double-stroke cylinder 4021 is on the same horizontal plane. The pulling fastener mounting block 4023 is fixedly connected with the corresponding mechanical clamping jaw 401. The double-stroke cylinder 4021 on the guide device 402 is disposed on the mounting base 301, and the mounting base 301 is provided with a slide rail groove 3011 to match with the slide rail 4024 on the guide device 402. The pulling fastener mounting block 4023 is fixedly mounted on the guide block 4025 accordingly, and the double-stroke cylinder 4021 drives the pulling fastener mounting block 4023 to drive the guide block 4025 to move equidistantly on the slide rail 4024. The mechanical clamping jaw 401 includes a moving claw 4011 and a clamping jaw 4012 fixed at an end portion of the moving claw 4011, and the moving claw 4011 is disposed on a corresponding pulling fastener mounting block 4023.

In the concrete operation, the mounting seat 302 is pushed by the biaxial cylinder 202 on the horizontal driving mechanism 2, which drives the entire pressing mechanism 3 to move horizontally along the guide rail 102 on the profile holder 1 through the slider 103, with the assistance of the auxiliary cylinder 204, the pressing mechanism 3 of the auxiliary cylinder is moved above the planting cup to be clamped accurately, then the pressing cylinder 303 on the pressing mechanism 3 drives the mounting base 301 to drive the planting cup grasping mechanism 4 to descend, then the clamping jaw 4012 is controlled by the moving claw 4011 on the planting cup grasping mechanism 4 to grasp the planting cup, and then the pressing cylinder 303 on the pressing mechanism 3 retracts, to allow the mechanical clamping jaw 401 to move upwards to lift the planting cup, so that the horizontal driving mechanism moves the pressing mechanism directly above the planting plate, then the first pulling fastener mounting blocks 4023 at both ends are pushed to move from the middle to both ends by the double-stroke cylinder 4021 on the guide device 402, so that one end of the pulling fastener block 4022 slides on the guide slot 40231 when the pulling fastener mounting block 4023 moves, when sliding to a certain position, the pulling fastener mounting block 4023 will be stuck, and when the pulling fastener mounting seat 302 continues to move, the pulling fastener block 4022 is driven to pull the next pulling fastener mounting block 4023 to move. In this manner, each of the pulling fastener mounting blocks 4023 is pulled, so that the pulling fastener mounting blocks 4023 drive the mechanical clamping jaws 401 to separate at an equal distance, so that the mechanical clamping jaws 401 can arrange the planting cups at an equal distance according to a specified requirement, and then fill them into the planting plate under the control of the pressing mechanism 3.

It should be noted that relational terms such as first and second are used herein only to distinguish one entity or operation from another and do not necessarily require or imply any such actual relationship or order between these entities or operations. Moreover, the terms "comprise", "include" or any other variation thereof are intended to encompass non-exclusive inclusion, so that a process, method, article or terminal equipment that includes a set of elements includes not only those elements but also other elements that are not explicitly listed, or also elements inherent to such a process, method, article or terminal equipment. In the absence of further limitations, the elements defined by the sentences "comprising . . . " or "including . . . " do not exclude the existence of other elements in the process, method, article or terminal equipment including the elements. In addition, in this paper, "greater than", "less than", "more than", etc. are understood to exclude this number; "above", "below" and "within" are understood to include this number.

While the above various embodiments are already described, once those skilled in the art understand basic creative concept, they can make additional modification and alteration for these embodiments. The above description is only the embodiments of the present invention and does not limit the patent scope of the present invention, any equivalent structure or equivalent process modification used according to the contents of the description and accompanying drawings in the present invention, no matter whether it is directly or indirectly used in any other related technical field, should be included within the protection scope of the present invention.

The invention claimed is:

1. A cup-loading device for planting cups, wherein the cup-loading device comprises a profile bracket, a horizontal driving mechanism, a pressing mechanism and a planting cup grasping mechanism fixed at an output end of the pressing mechanism, wherein the horizontal driving mechanism and the pressing mechanism are disposed on the profile bracket, the horizontal driving mechanism drives the pressing mechanism to move horizontally along the profile bracket, and the pressing mechanism drives the planting cup grasping mechanism to move in a vertical direction, and the planting cup grasping mechanism includes a plurality of mechanical clamping jaws and a guide device for adjusting a spacing between adjacent mechanical clamping jaws, the guide device comprises a double-stroke cylinder, a plurality of pulling fastener blocks, a plurality of pulling fastener mounting blocks, a slide rail and a plurality of guide blocks arranged regularly on the slide rail, the double-stroke cylinder pushes the plurality of pulling fastener mounting blocks to move from a middle to two opposite ends along the slide rail and drives the plurality of guide blocks to move at an equal distance.

2. The cup-loading device for planting cups according to claim 1, wherein the horizontal driving mechanism comprises a cylinder mounting seat and a biaxial cylinder, the cylinder mounting seat is fixedly connected to the profile bracket, the biaxial cylinder is mounted on the cylinder mounting seat, the biaxial cylinder is provided with a push plate, the push plate is provided with an auxiliary cylinder for adjusting a horizontal displacement distance, and an output end of the auxiliary cylinder is fixedly connected with the pressing mechanism.

3. The cup-loading device for planting cups according to claim 1, wherein the pressing mechanism comprises a mounting base, a mounting seat and a pressing cylinder, the mounting seat is disposed and mounted on an output end of the horizontal driving mechanism, the mounting base is T-shaped and connected to a first side of the mounting seat, the pressing cylinder is disposed on a second side of the mounting seat, an output end of the pressing cylinder is fixedly connected with a transverse plate at a bottom end of the mounting seat, the planting cup grasping mechanism is disposed and mounted on the mounting base, the mounting seat is provided with a connecting plate and connecting blocks fixed at four corners of the connecting plate, the profile bracket is two symmetrical horizontal supporting rods, a guide rail mounting seat and a guide rail fixed on the guide rail mounting seat are disposed above each of the two symmetrical horizontal supporting rods, and the guide rail is provided with a mating slider which is fixedly connected with the connecting block.

4. The cup-loading device for planting cups according to claim 1, wherein the plurality of pulling fastener mounting blocks are disposed on the plurality of guide blocks in a one-to-one correspondence, the plurality of pulling fastener blocks are fixedly connected to the plurality of pulling fastener mounting blocks, an output end of the double-stroke cylinder is provided with a fixing block connected with the pulling fastener mounting block at an outermost end, output directions of the double-stroke cylinder are opposite, and the plurality of pulling fastener mounting blocks are fixedly connected with the plurality of mechanical clamping jaws.

5. The cup-loading device for planting cups according to claim 4, wherein a guide slot is defined on each of the plurality of pulling fastener mounting blocks, a first end of each of the plurality of pulling fastener blocks is embedded in the guide slot of a first pulling fastener mounting block of the plurality of pulling fastener mounting blocks, a second end of each of the plurality of pulling fastener blocks is fixedly connected with a second pulling fastener mounting block of the plurality of pulling fastener mounting blocks, such that the plurality of pulling fastener blocks are connected with the plurality of pulling fastener mounting blocks.

6. The cup-loading device for planting cups according to claim 4, wherein the double-stroke cylinder on the guide device is disposed on the mounting base, and the mounting base is provided with a slide rail groove matched with the slide rail on the guide device, and the double-stroke cylinder drives the plurality of pulling fastener mounting blocks to drive the plurality of guide blocks to move equidistantly on the slide rail.

7. The cup-loading device for planting cups according to claim 6, wherein each of the plurality of mechanical clamping jaws comprises a moving claw and a clamping jaw fixed on an end portion of the moving claw, and the moving claw is disposed and mounted on a corresponding pulling fastener mounting block of the plurality of pulling fastener mounting blocks.

* * * * *